UNITED STATES PATENT OFFICE.

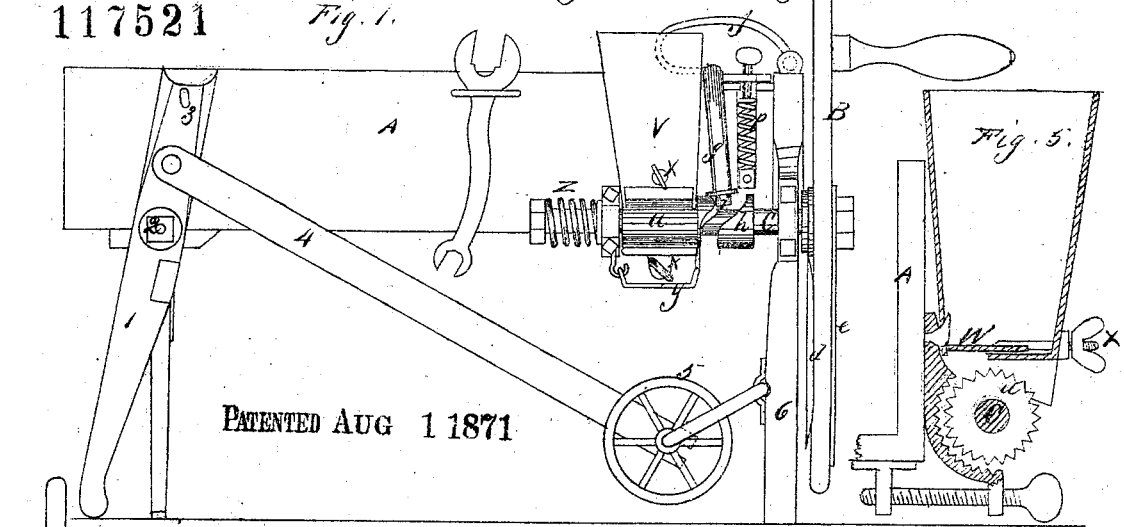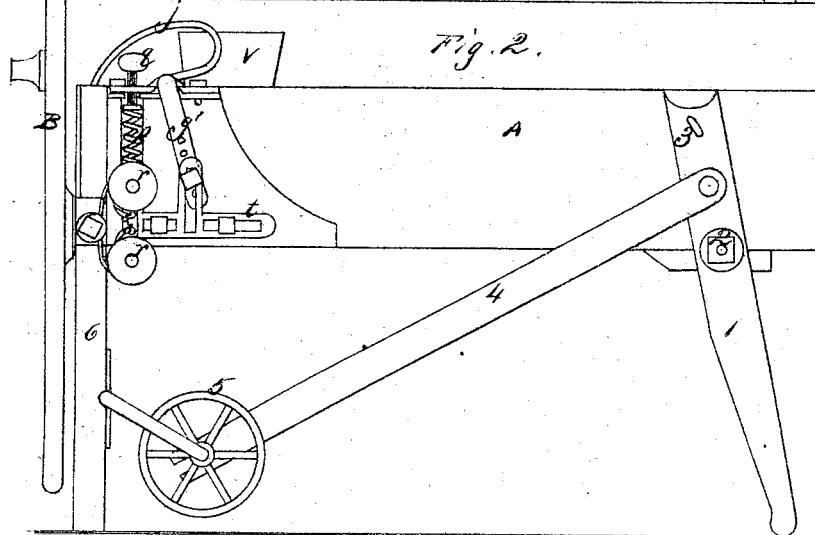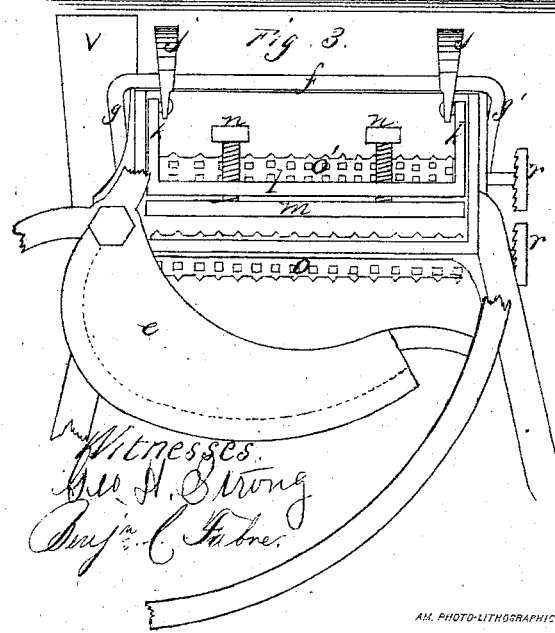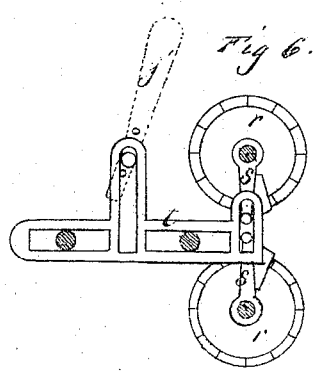

CARLES R. DONNER, OF SONORA, CALIFORNIA.

IMPROVEMENT IN FEED-CUTTERS.

Specification forming part of Letters Patent No. 117,521, dated August 1, 1871.

*To all whom it may concern:*

Be it known that I, CARLES R. DONNER, of Sonora, county of Tuolumne, State of California, have invented an Improved Feed-Cutting-and-Grinding Box; and I do hereby declare the following description and accompanying drawing are sufficient to enable any person skilled in the art or science to which it most nearly appertains to make and use my said invention or improvement without further invention or experiment.

My invention relates to certain improvements in boxes for cutting straw in preparing food for cattle, being an improvement upon Letters Patent No. 108,118, which were issued to me on the 11th day of October, 1870; and it consists, first, in an improved arrangement of mechanism for feeding forward the straw in the box under the knife and for clamping it while it is being cut; and, secondly, in so mounting the feed-box that it can be readily converted into a cart, in order to render it convenient for moving from place to place as desired.

In order to describe and illustrate my invention, reference is had to the accompanying drawing forming a part of this specification, in which—

A represents the box in which the straw or hay is placed for feeding to the knife. The wheel B is revolved vertically across the end of the box A, its center being supported at the end of the horizontal shaft C, at one side of the box. The cutting-knife $d$ is fixed to the inside of one of the arms of the wheel B in the manner described in my former patent. A guard, $e$, which consists of a plate of metal larger than the knife $d$, is secured to the outside of the same arm, and serves to inclose the knife and prevent accidents. A rock-shaft, $f$, passes transversely across the box A, bearing upon its sides near the cutting end. The opposite ends of this shaft are bent downward outside of the box, forming operating-arms $g$ $g'$ on opposide sides of the box. The arm $g$ has secured to its lower end a pin, $i$, which operates in the cam-groove of the cylinder $h$, and by means of which a reciprocating motion is given to the arm and a rocking motion to the shaft $f$. The cylinder $h$ forms a portion of the shaft C, which extends still further back, as will be hereinafter explained. Secured to the shaft $f$, near each side of the box, is a stiff steel spring, $j$, which curves forward and is connected with arms $k$ of a clamping-bar, $l$. This bar has small pins extending from each end, which move in a slide in the side of the box. Beneath the bar $l$ is another bar, $m$, which is connected to the bar $l$ by set-screws $n$, by means of which the bar $m$ can be adjusted up or down, as required, to clamp the straw in place. Each rock of the shaft $f$ causes the springs $j$ to lift the bars $l$ and $m$ so that the straw can be fed beneath them, after which the bars move down and hold it while it is being cut. Also, passing across this end of the box, inside of the clamping-bars, are two corrugated feeding-rollers, $o$ $o'$, one of them, $o$, being so placed that its upper surface will be slightly above the level of the floor, while the other, $o'$, is placed a short distance above the first and is held down by spiral or other springs, $p$, at each side of the box. The tension of these spiral springs is regulated by a set-screw, $q$. Upon the end of one of the journals of each of the rollers $o$ $o'$ is fixed a ratchet-wheel, $r$. Links $s$ have one end loosely attached to the journals inside the ratchet-wheels, and at their opposite end is formed a catch or pawl, which engages with the teeth of the ratchet. A horizontal slotted slide, $t$, is attached to the side of the box and is operated back and forth by the arm $g'$ of the rock-shaft $f$. The ends of the links $s$ are both connected with the slide, so that they shall vibrate back and forth with it and at each movement engage with another tooth of the ratchet $r$, and thus cause them to slowly revolve and feed the straw forward under the clamping-bar. A spiral spring, $z$, at the end of the shaft C, allows it to have an end motion in order to relieve the cutting-knife in case of strain upon it by any means. The rear legs 1 are secured to the box A by a bolt, 2, which passes through boxes on the under side of the feed-box. These legs extend above the bolt, on each side, and are secured near their upper ends to the sides of the box by a thumb-screw, 3. A connecting-rod, 4, is attached to each of the legs, above the bolt 2, and extends down to the axle of a pair of wheels, 5, which are connected by cranks to the rear legs 6. When the legs 1 are in a position to support the rear of the box the connecting-rod 4 will draw the trunk up so that it will be clear of the floor; but when the screws 3 are withdrawn and the legs thrown out so as to form handles, the truck will be lowered by the turning of the cranks so as to bear upon the ground, thus converting the machine into a cart, which can be propelled from place to place with great ease.

Having thus described my invention, what I claim, and desire to secure by Letters Patent, is—

1. The rock-shaft $f$, with its arms $g$ $g'$ and curved springs $j$, in combination with the bar $l$ and adjustable clamping-bar $m$, substantially as and for the purpose above described.

2. The wheels 5, secured to the front legs by a crank-axle and connected with the pivoted rear legs 1, at some point above the bolt 2, by a connecting-rod, 4, substantially as and for the purpose above described.

In witness whereof I have hereunto set my hand and seal.

CARLES R. DONNER. [L. S.]

Witnesses:
 GEO. H. STRONG,
 BENJN. C. FABRE.